(No Model.)
P. BUTTWEILER & B. STUNTEBECK.
FERTILIZER DISTRIBUTER.
No. 541,035. Patented June 11, 1895.
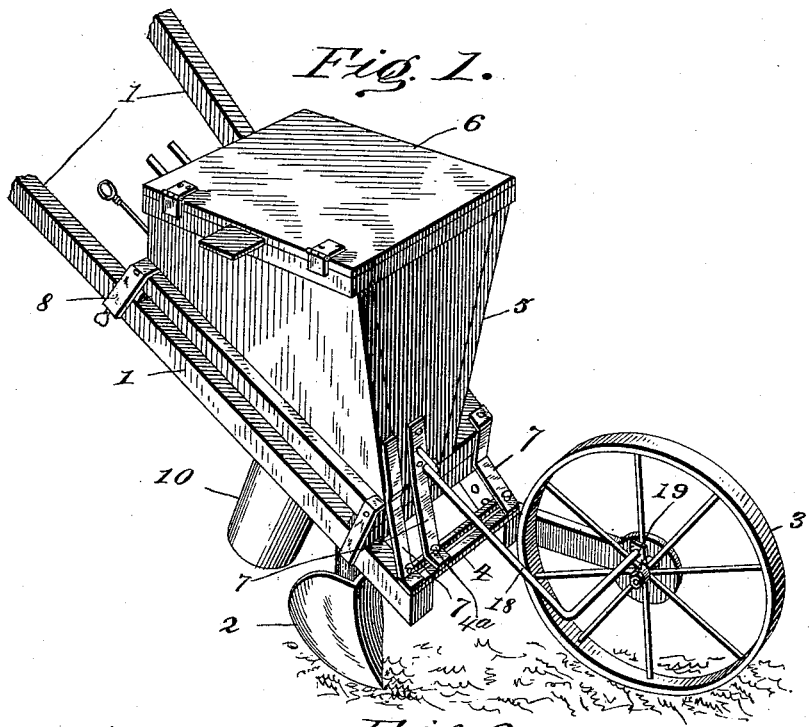
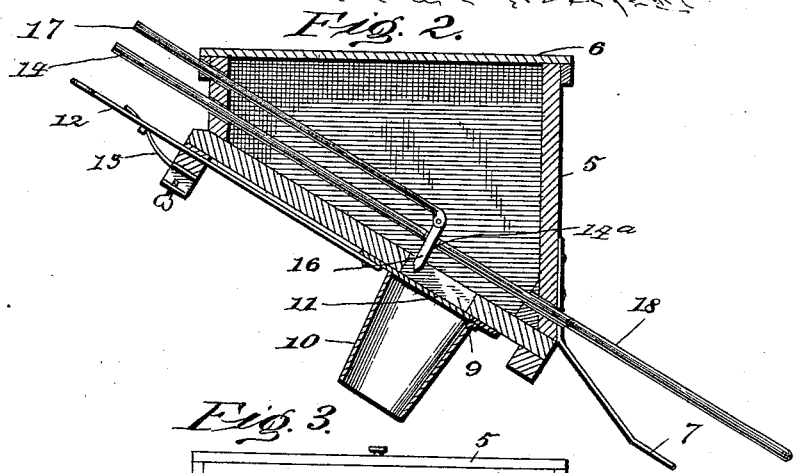
Witnesses
Theo. L. Gatchel
W. P. Wilson
Inventors
Peter Buttweiler
Borromans Stuntebeck
by John Wedderburn
their Attorney.

UNITED STATES PATENT OFFICE.

PETER BUTTWEILER AND BORROMANS STUNTEBECK, OF ST. JOSEPH, FLORIDA; SAID STUNTEBECK ASSIGNOR TO SAID BUTTWEILER.

FERTILIZER-DISTRIBUTER.

SPECIFICATION forming part of Letters Patent No. 541,035, dated June 11, 1895.

Application filed December 18, 1894. Serial No. 532,155. (No model.)

*To all whom it may concern:*

Be it known that we, PETER BUTTWEILER and BORROMANS STUNTEBECK, citizens of the United States, residing at St. Joseph, in the county of Pasco and State of Florida, have invented certain new and useful Improvements in Fertilizer-Distributers; and we do hereby declare the following to be a full, clear, and exact description of the invention, such as will enable others skilled in the art to which it appertains to make and use the same.

Our invention relates to improvements in fertilizer distributers, having for its object to provide a device of this nature which is adapted to be attached to a single wheel hand plow.

The invention consists of a hopper provided with a suitable hinged lid or cover having an inclined bottom. This hopper is adapted to be secured to the handles of a plow by means of clips, through which pass screw bolts, and is provided with a spout on the under side thereof from which the fertilizer is fed directly in the rear of the plow and a feeding rod therein, adapted to be operated by a crank connection with the wheel of the plow.

The invention also consists of other details of construction and combination of parts, which will be more fully hereinafter described and claimed.

In the drawings forming a part of this specification, Figure 1 represents a perspective view of our device as applied to a single-wheel hand-plow. Fig. 2 is a vertical central longitudinal section through the same. Fig. 3 is a plan view of a hopper with the lid or cover thereof removed.

Like numerals of reference indicate like parts in the various views.

1 represents the handle bars of an ordinary single wheel hand plow, 2 the plow blades thereof and 3 a wheel upon which the same is adapted to run. Near the lower end of the said handle bars 1 is a cross-bar 4 having a slot therein to which the hopper is attached and adjusted by means of screw bolts 4ª.

5 represents the hopper which has hinged thereto a lid or cover 6. The bottom of the said hopper is inclined downwardly and at the forward part thereof is provided with brackets 7, by means of which the hopper is attached at its lower end to the cross-bar 4, by screw bolts or otherwise. The rear end of the hopper is provided with clips 8 which surround the handle bars 1 and have screws passing therethrough for the purpose of securing said hopper to said handle bars. By this construction, it will be seen that our hopper may be attached to any ordinary single wheel hand plow.

The bottom of the hopper 5 has therein an opening 9 from which the fertilizer is discharged to the spout 10, just in rear of the plow blades 2. The size of this opening may be regulated by means of a slide 11 fitting thereunder and having a rod 12 leading along the under side of the hopper, which may be operated by hand by the driver of the machine. Springs 13 engage said rod for the purpose of holding the same in its adjusted position.

Running transversely of the hopper 5 near the bottom thereof is a rod 14, which extends outside the hopper at the forward part thereof and has pivotally connected therewith a pitman 18 on the wrist 19 on the wheel 3. The rod 14 is slotted at a point 14ª through which projects the bent end 16 of the feed rod 17, which acts as an agitator. The latter rod 17 leads to the outside through the rear part of the hopper and can be operated by hand to feed the fertilizer. By this arrangement the rotation of the wheel 3 and the forward movement of the device will cause a reciprocating motion to be imparted to the bar 14 and thereby the automatic feeding of the fertilizer to the spout 10. If for any reason, the openings become clogged or it is desired to operate the feeding rod 14, by hand the same may be done by the rod 17 extending outside the hopper 5. The opening 9 may be entirely closed or otherwise regulated when desired by means of the rod or cut-off slide 12.

Our invention has been described in its preferred form, but it is obvious that many minor changes may be made therein without departing from the nature or spirit of the invention or sacrificing any of its advantages.

Having thus described the invention, what is claimed as new is—

1. The combination with a single wheel hand plow, of a hopper for feeding fertilizer, having an inclined bottom and an opening at the lower end thereof, a bar slotted at one point in its length, extending through and outside the hopper, a pitman pivotally connected therewith and to a wrist on the plow wheel, whereby reciprocating motion is given to said bar, and a feed rod having a bent end which acts as an agitator fitting and projecting through the slot in said bar and extending outside the hopper at the rear thereof, substantially as and for the purpose described.

2. The combination with a single wheel hand plow, of a hopper for feeding fertilizer having an inclined bottom and an opening at the lower end thereof, a spout leading from said opening, a bar slotted at one point in its length, extending through said hopper near the bottom thereof, a pitman pivotally connected to said bar and to a wrist on the plow wheel, a feed rod having a bent end which acts as an agitator fitting and projecting through the slot in said bar and extending outside the hopper, by means of which it may be operated by hand, and independent means for opening and closing the opening in said hopper, substantially as and for the purpose described.

In testimony whereof we have signed this specification in the presence of two subscribing witnesses.

PETER BUTTWEILER.
BORROMANS STUNTEBECK.

Witnesses:
G. D. B. DELCHER,
J. K. DAVIS.